(12) United States Patent
Gassner et al.

(10) Patent No.: US 12,743,432 B1
(45) Date of Patent: Sep. 22, 2026

(54) SYSTEM AND METHOD FOR GENERATING DYNAMIC USER INTERFACE IN ENTERPRISE CONTENT MANAGEMENT

(71) Applicant: Veeva Systems Inc., Pleasanton, CA (US)

(72) Inventors: Peter Gassner, Pleasanton, CA (US); Bobby Ng, San Ramon, CA (US); Andrew Han, Needham, MA (US); Shu-Shang Sam Wei, Danville, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 17/359,406

(22) Filed: Jun. 25, 2021

(51) Int. Cl.
*G06F 16/2457* (2019.01)

(52) U.S. Cl.
CPC .............................. *G06F 16/24578* (2019.01)

(58) Field of Classification Search
CPC ................................................ G06F 16/24578
USPC .......................................................... 707/723
See application file for complete search history.

(56) References Cited

U.S. PATENT DOCUMENTS

2008/0207182 A1* 8/2008 Maharajh ........... H04N 21/6112 455/414.1
2011/0225417 A1* 9/2011 Maharajh .............. H04L 65/752 713/150
2014/0282586 A1* 9/2014 Shear .................... G06F 9/5072 718/104
2015/0248484 A1* 9/2015 Yu ....................... G06F 16/9535 707/711
2016/0041723 A1* 2/2016 Ren ..................... G06F 3/04883 715/765
2020/0077138 A1* 3/2020 Sawyer .............. H04N 21/4524
2020/0379776 A1* 12/2020 Lo ...................... G06Q 30/0269
2021/0165624 A1* 6/2021 Bliss ....................... G10L 15/26
2021/0398671 A1* 12/2021 Gnanasambandam ..................... G06F 16/367

* cited by examiner

*Primary Examiner* — Boris Gorney

(57) ABSTRACT

Systems and methods for generating a dynamic user interface in a content management system. User actions on items in the content management system may be tracked based on the process carried out by an application program, the user's role, and lifecycle state of the items and a user action history may be dynamically updated with user actions. User actions in the user action history may be ranked. An area of most frequently used actions is displayed together with an item from the content management system in response to a user request for the item. The area of most frequently used actions may be started with default configuration, and dynamically updated with ranking of user actions in the user action history.

18 Claims, 12 Drawing Sheets

Figure 6:
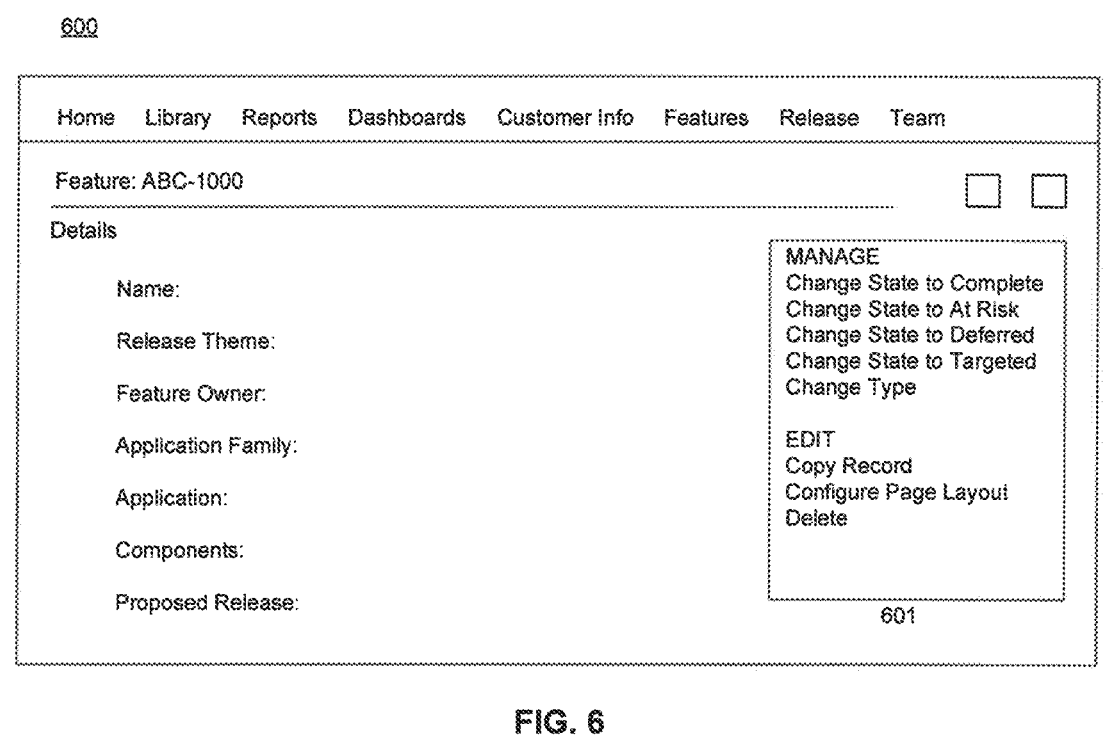

600

Home Library Reports Dashboards Customer Info Features Release Team

Feature: ABC-1000

Details

Name:

Release Theme:

Feature Owner:

Application Family:

Application:

Components:

Proposed Release:

MANAGE
Change State to Complete
Change State to At Risk
Change State to Deferred
Change State to Targeted
Change Type EDIT
Copy Record
Configure Page Layout
Delete

Figure 7:
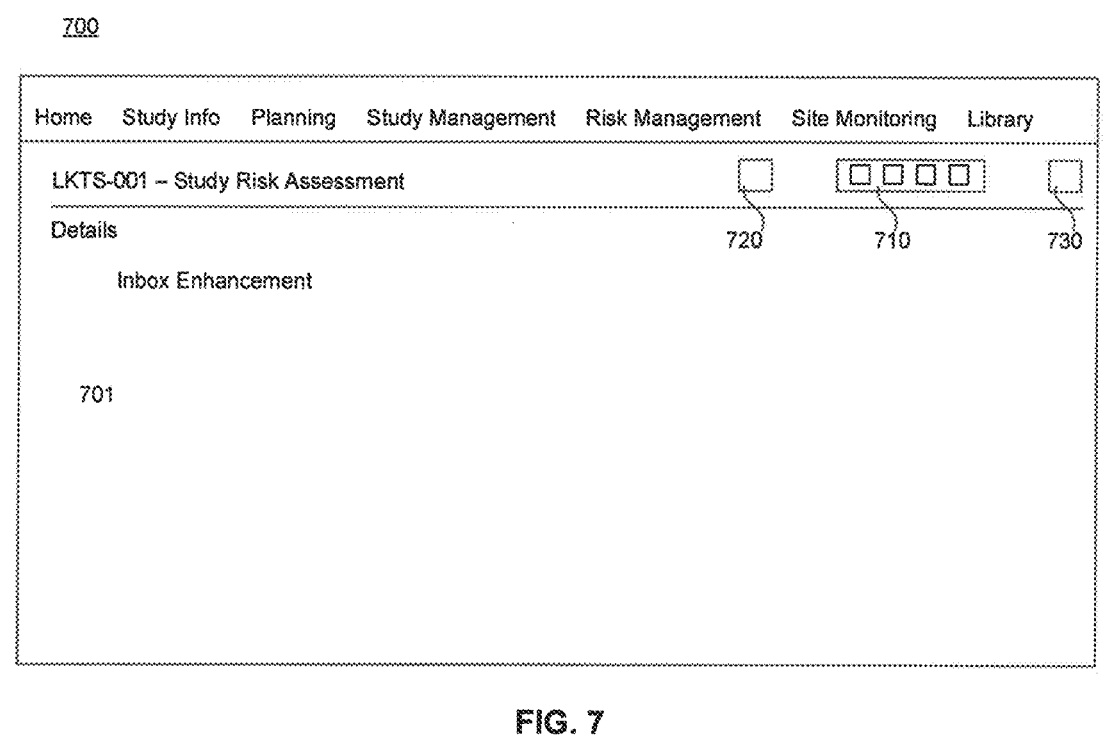

Home Study Info Planning Study Management Risk Management Site Monitoring Library LKTS-001 – Study Risk Assessment 720 710 730

Details

Inbox Enhancement

Figure 9:
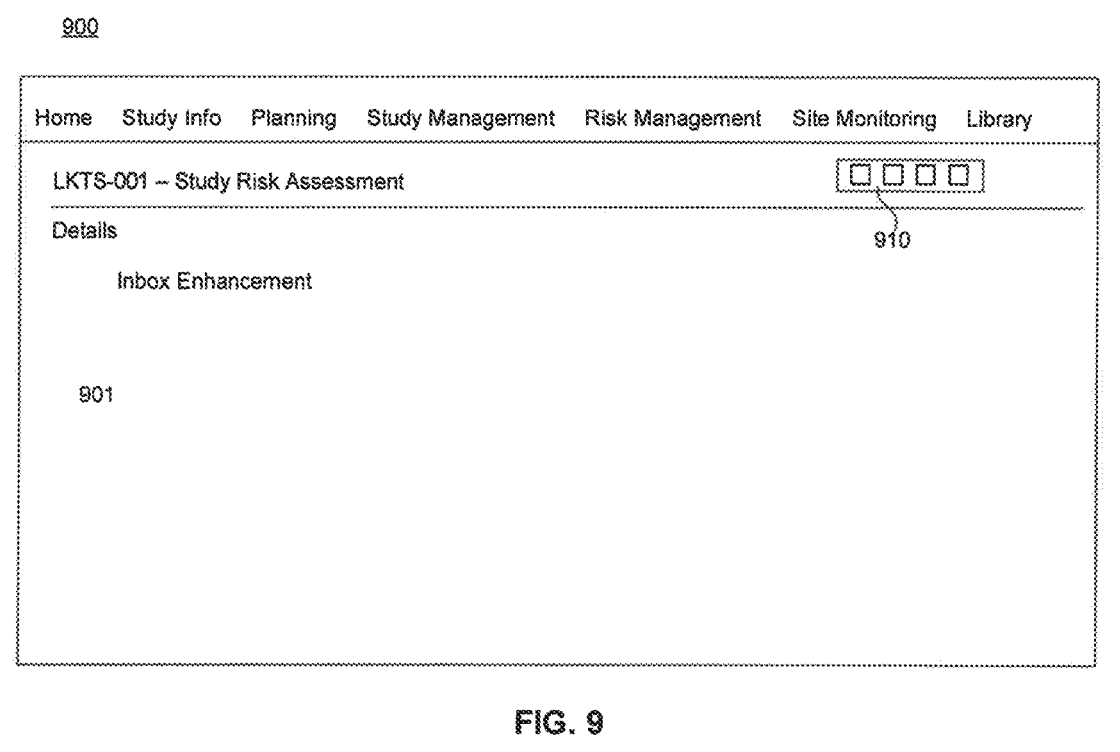

Home Study Info Planning Study Management Risk Management Site Monitoring Library LKTS-001 – Study Risk Assessment

910

Details

Inbox Enhancement

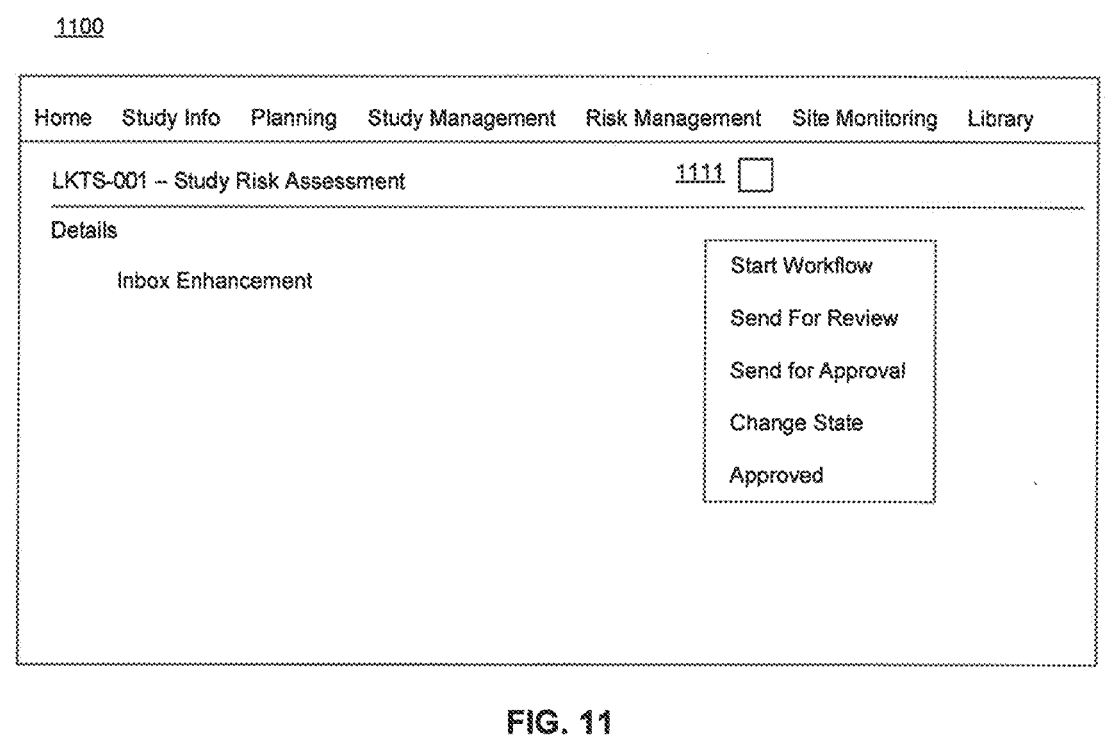

Home Study Info Planning Study Management Risk Management Site Monitoring Library LKTS-001 -- Study Risk Assessment 1111

Details

Inbox Enhancement

Start Workflow

Send For Review

Send for Approval

Change State

Approved

FIG. 11

SYSTEM AND METHOD FOR GENERATING DYNAMIC USER INTERFACE IN ENTERPRISE CONTENT MANAGEMENT

BACKGROUND

The subject technology relates generally to content management, and more particularly to generating dynamic user interfaces in enterprise content management systems.

Users increasingly depend on content management systems because of their ubiquitous and managed access, from anywhere, at any time, from any device. Users may use various processes carried out by application programs in a content management system to manage documents and records. It is desirable to provide more user-friendly interfaces to help users to perform actions on the documents and/or records more efficiently during the processes.

SUMMARY

The disclosed subject matter relates to a method for generating dynamic user interfaces in a content management system, wherein the content management system comprises a first repository, a second repository, a content management server, and a dynamic user interface generator. The method comprises: receiving at the content management controller a request from a first user for displaying a first item stored in the content management system related to a first process; displaying a first user interface which comprises a first area for displaying the first item and a second area for displaying a first button for a first frequently used action and a second button for a second frequently used action, wherein the first button and the second button are displayed based on a default configuration with the first button being displayed in a place representing a most frequently used action and the second button being displayed in a place representing a second most frequently used action. The method comprises: determining a first user's role related to the first item; determining a lifecycle state of the first item; determining that a first user action is acceptable based on the first process; updating an action history of the first user with the first user action; ranking the first frequently used action and the second frequently used action in the updated action history of the first user; receiving at the content management controller a request from the first user for displaying a second item stored in the content management system related to the first process; and displaying a second user interface which comprises a third area for displaying the second item and a fourth area for displaying frequently used actions, wherein the fourth area for displaying frequently used actions is updated based on the updated action history of the first user.

BRIEF DESCRIPTION OF THE DRAWINGS

FIG. 6 illustrates a user interface with a drop-down menu.

FIG. 7 illustrates an example dynamic user interface according to one embodiment of the present invention.

FIG. 9 illustrates an example dynamic user interface according to one embodiment of the present invention.

FIG. 11 illustrates an example dynamic user interface according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
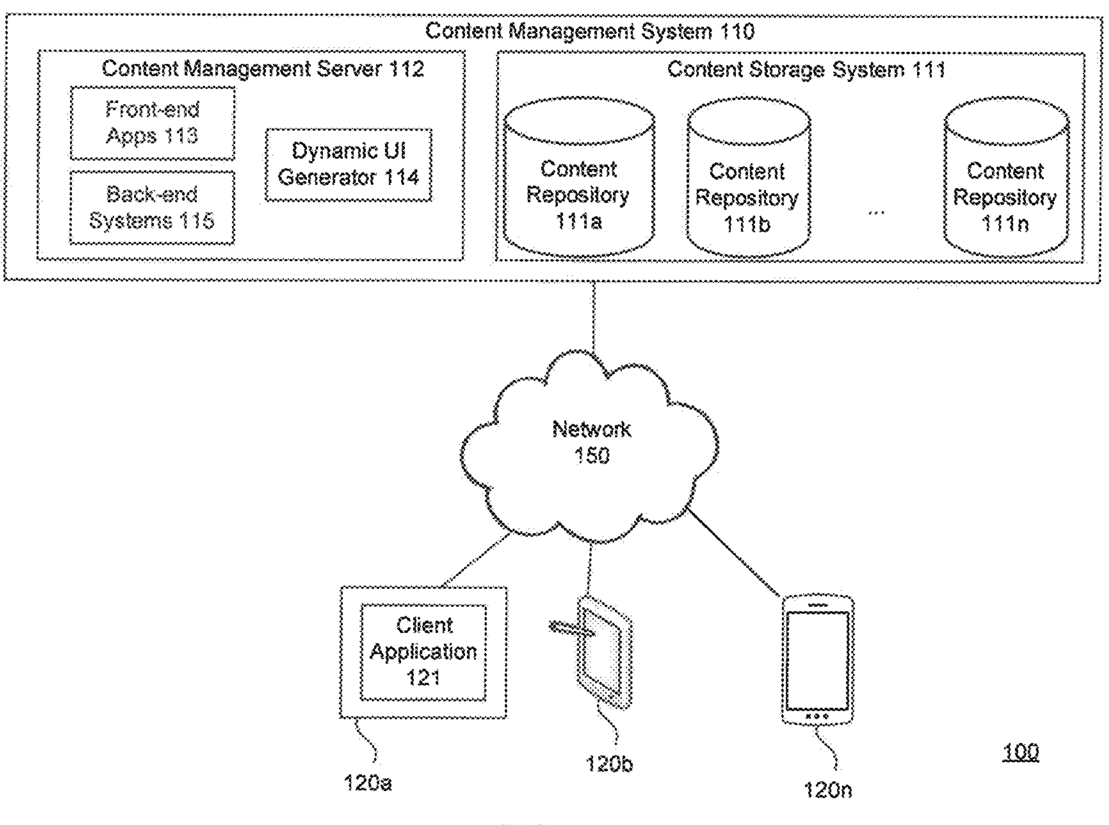
FIG. 1 illustrates an example high level block diagram of an enterprise content management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120*a*, 120*b*, . . . 120*n*, coupled to each other via a network 150. The content management system 110 may include a content storage system 111 and a content management server 112. The content storage system 111 may have two or more content repositories, e.g., 111*a*, 111*b*, . . . and 111*n*. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120*a*-120*n* may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120*a*, and access content in the content management system 110 via the network 150. User computing devices 120*a*-120*n* are illustrated in more detail in FIG. 4.

The content storage system 111 may store content that client applications (e.g., 121) in user computing devices 120*a*-120*n* may access and may be any commercially available storage devices. As will be described with reference to FIG. 2 below, each content repository (e.g., 111*a*, 111*b* or 111*n*) may store a specific category of content.

The content management server 112 is typically a remote computer system accessible over a remote or local network, such as the network 150. The content management server 112 could be any commercially available computing devices. A client application (e.g., 121) process may be active on one or more user computing devices 120*a*-120*n*. The corresponding server process may be active on the content management server 112, as one of the front-end applications 113 described with reference to FIG. 2. The client application process and the corresponding server process may communicate with each other over the network 150, thus providing distributed functionality and allowing multiple client applications to take advantage of the information-gathering capabilities of the content management system 110.

The content management server 112 may include a dynamic user interface generator 114 which may control the process for generating dynamic user interfaces, as will be described with reference to FIGS. 7-11 below.

Although the front-end applications 113, back-end systems 115, and the dynamic user interface generator 114 are shown in one server, it should be understood that they may be implemented in multiple computing devices.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
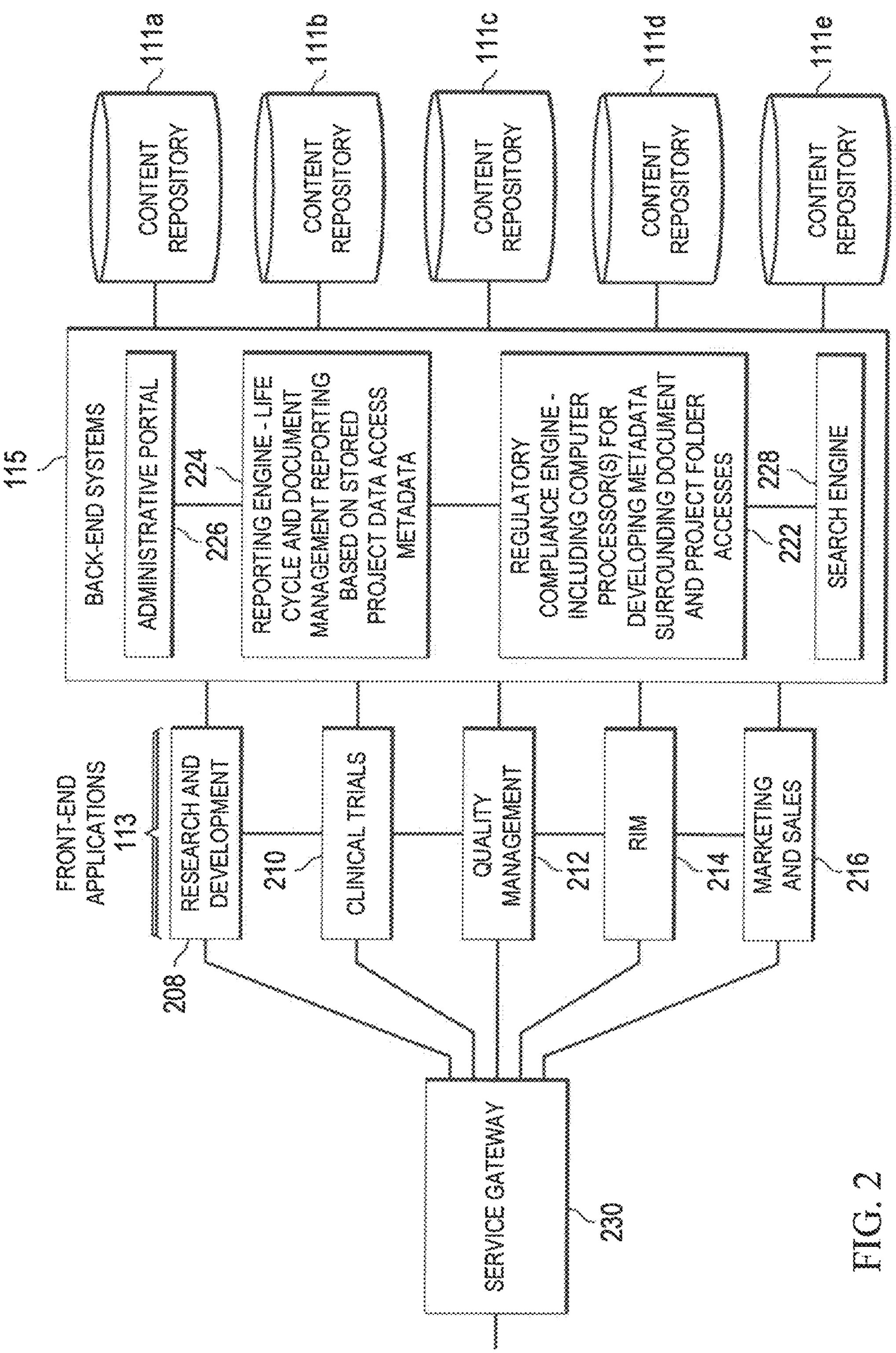
FIG. 2 provides a description of the content management system with additional specific applications and interfaces connected thereto.

FIG. 2 provides a description of the content storage system 111 with additional specific applications and interfaces connected thereto. In an embodiment, this content storage system 111 is a cloud-based or distributed network based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in the figure, this content storage system 111 can include specific data collections for the following areas and/or business process-specific front-end applications 113:

A Research & Development (R&D) front-end application 208 provides for an aggregation of materials in support of research and initial clinical trial submissions through building organized and controlled content repositories within the content management system 110, more specifically, the content repository 111*a*. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

A clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111*b*, between this phase and other phases of the life sciences development process.

A manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the content management system 110, or more specifically, the content repository 111*c*, whereby it can be assured that the related documents are not distributed in contravention of law and company policy. The application 212 also manages business processes including change control, complaints, corrective actions and preventive actions ("CAPA"), deviation and audits.

A regulatory information management ("RIM") application 214 provides for management of regulatory information, submission processes and submission reports, which may include, e.g., safety reporting, product registrations, health authority interactions, central and local requirements, submissions to health authorities, and health authority information management. The product registration information may include, e.g., the associated product information, application information, application date, registration details, key registration dates, marketing status, and marketing details. The health authority interactions may include bidirectional interactions with health authorities globally, including correspondences, commitments and queries. Pharmaceutical companies may submit registration applications to health authorities to get approval for selling products in a country. The registration process may take a few months and status of the registration may change over time. User may see global registrations and their status in one or more submission reports. Related documents may be stored in the content repository 111*d*.

A marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111*e*. In one embodiment, the present invention may be used to link the promotional materials to claims.

The content management system 110 may have a number of back-end system applications 115 that provide for the management of the data, forms, and other communications in. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

The back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

The back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

The back-end systems 115 may include a search engine 228 whereby the content management system 110 can deliver simple, relevant and secure searching. In one embodiment, the search engine 228 may be used to search appropriate supporting documents for a claim.

The content management system 110 may have more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back end systems 115, enabling seamless integration among complementary systems.

The content management system 110 may store content for other industries.

Figure 3:
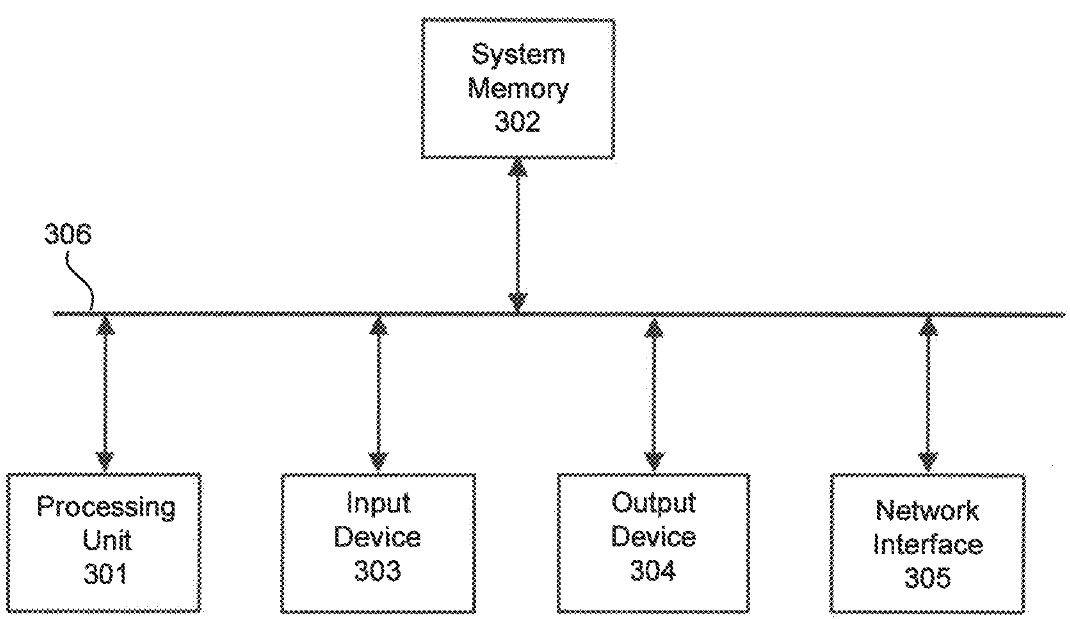
FIG. 3 illustrates an example high level block diagram of a computing device.

FIG. 3 illustrates an example block diagram of a computing device 300 which can be used as the user computing devices 120*a*-120*n*, and the content management server 112 in FIG. 1. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may be configured to allow the computing device 300 to transmit and receive data in a network, for example, the network 150. The network interface 305 may include one or more network interface cards (NICs).

Figure 4:
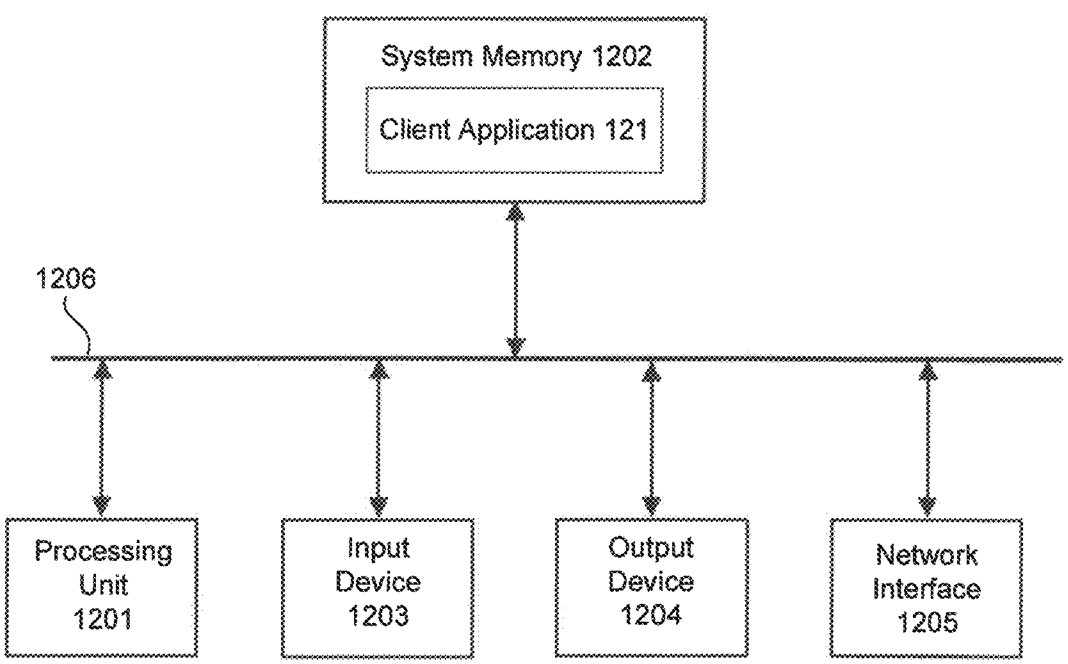
FIG. 4 illustrates an example high level block diagram of a user computing device.

FIG. 4 illustrates an example high level block diagram of a user computing device (e.g., 120*a*) wherein the present invention may be implemented. The user computing device 120*a* may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
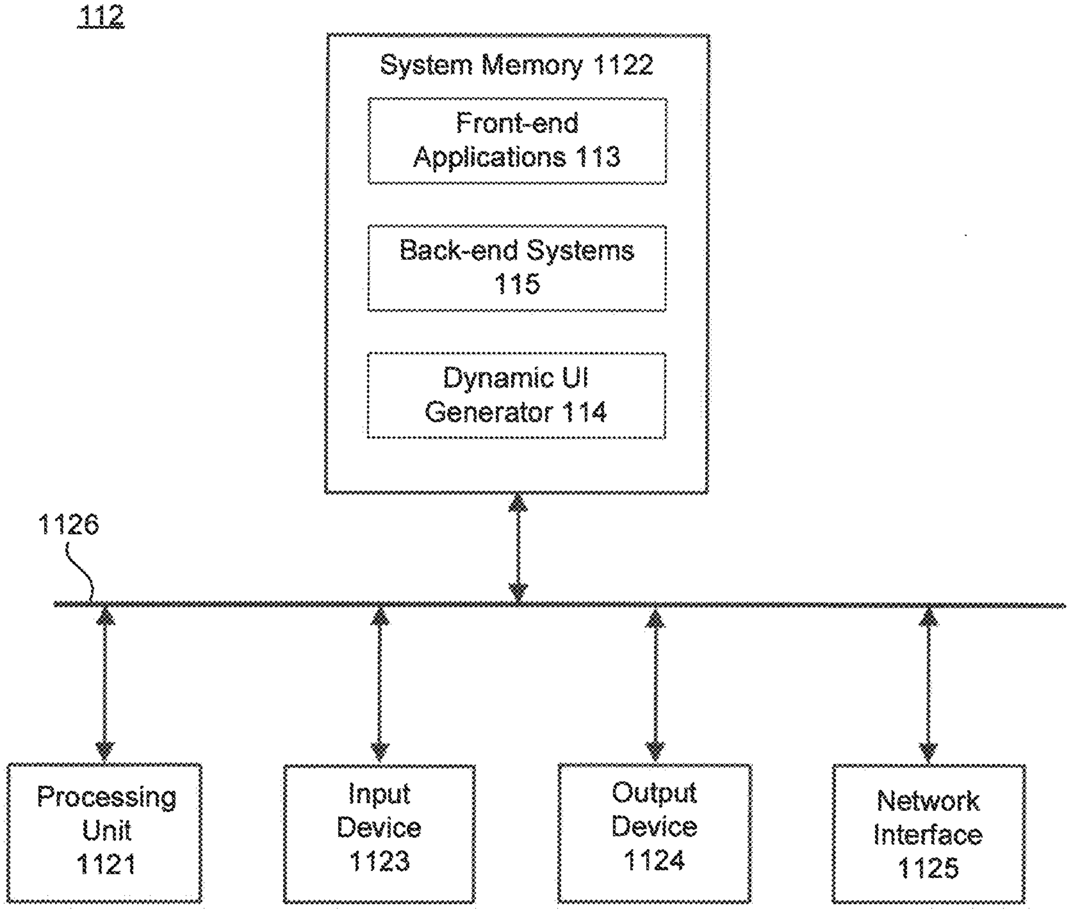
FIG. 5 illustrates an example high level block diagram of the content management server according to one embodiment of the present invention.

FIG. 5 illustrates an example high level block diagram of the content management server 112 according to one embodiment of the present invention. The content management server 112 may be implemented by the computing device 300, and may have a processing unit 1121, a system memory 1122, an input device 1123, an output device 1124, and a network interface 1125, coupled to each other via a system bus 1126. The system memory 1122 may store the front-end applications 113, more specifically the marketing and sales application 216, the back-end systems 115 and the dynamic user interface generator 114.

In a content management system, a user may perform various actions pertaining to a record or document he/she is looking at, e.g., editing a record, copying a record, deleting a record, starting a workflow, approving a document, or rejecting a document. The content management system 110 may provide actions the user can take. In one example, the actions may be displayed in a drop-down menu so that the user may select one he/she wants to take by clicking on the menu button to display the drop-down menu, picking one action he/she wants to take from the drop-down menu, and clicking on the button for the action he/she wants to take. FIG. 6 illustrates a user interface 600 with a drop-down menu. As shown, the drop-down menu 601 may include actions the user may take, e.g., Change State to Complete, Change State to At Risk, Change State to Deferred, Change State to Targeted, Change Type, Copy Record, Configure Page Layout, Delete.

The present invention provides a dynamic user interface which may dynamically display most frequently used actions, and may be determined based on the user's role, the lifecycle state of a document or record, and/or history of actions the user took. As shown in FIG. 7, the dynamic user interface may include an area 701 for displaying a document or record, and an area 710 for displaying buttons of most frequently used actions. In one embodiment, the area 710 may display quick access buttons to perform the user's own frequently used actions, which may include a button for editing a document, a button for downloading the document, a button for copying the document, and a button for sharing the document. The area 710 may be configured to display more or fewer buttons based on, e.g., the type of document, the type of record, object type, logic type, the application program and the process it carries out, the user's role and/or action history, or the lifecycle state of the document. The present invention may track these factors, determine what the user has done most frequently on the document, and display the most frequently used action buttons so that he/she can see the buttons directly on the user interface and immediately clicking on the buttons without having to open up a drop-down menu.

The dynamic user interface 700 may include an area 720 for displaying a dedicated workflow button to start a workflow and change lifecycle state. In one application program, a record or document in the content management system may go through a review or approval process, and have different states, e.g., draft, review, revise, approval, and publish. The user may take a number of actions on the document/record in each state, depending on the application program, and the user's role. For example, the user may change the state of a document from draft to review.

The dynamic user interface generator 114 may track the state of the record/document, and display all actions available at the current state of the document/record in the specific process in the area 720 as a dedicated button. The user may click on the dedicated Workflow button and choose one of the actions in a drop-down menu associated with the dedicated workflow button. In one embodiment, when there is only one action available, the action will be displayed in the area 720 directly when the user mouses over the workflow button. But if there are two or more actions available, a drop-down menu may be displayed so that the user can choose one action. When there is no action available for that state of the record, the workflow button is not displayed.

The area 720 may make the actions more visible and indicate to the users that there are actions for him/her to take for the document/record currently displayed in the area 701 on the user interface 700 to advance the process, so as to help the user to take that action quickly and easily. As will be described below with reference to FIGS. 8A, 8B and 9-11, the buttons in the area 720 may be configured based on the application program, the type of document/record, the state of the document/record, and the user's role.

The dynamic user interface 700 may include a drop-down menu area 730 for displaying a drop-down menu for actions the user may take. In one embodiment, the drop-down menu may include actions displayed in the areas 710 and 720. In one embodiment, the drop-down menu may display all actions available to the specific user at the current state of the document/record.

The present invention may improve usability of the user interface 700 by dynamically determining and directly exposing most frequently used actions in the area 710, and by dynamically determining and directly exposing the workflow button in the area 720, so that it is easier for the user to see the actions he/she is most likely to take and pick the actions quickly.

Figure 8A:
FIGS. 8A and 8B illustrate a flowchart of a method for generating a dynamic user interface according to one embodiment of the present invention.
Figure 8A:
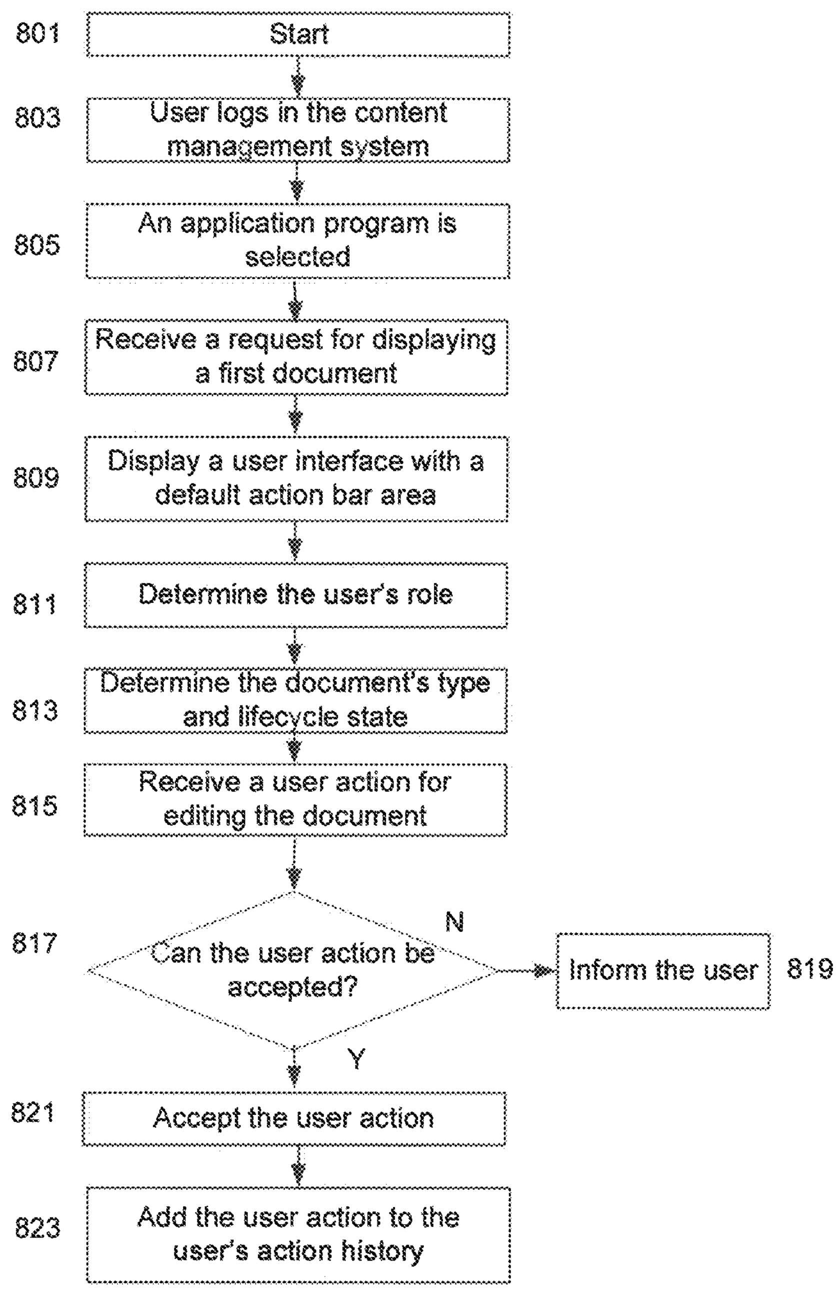
Figure 8B:
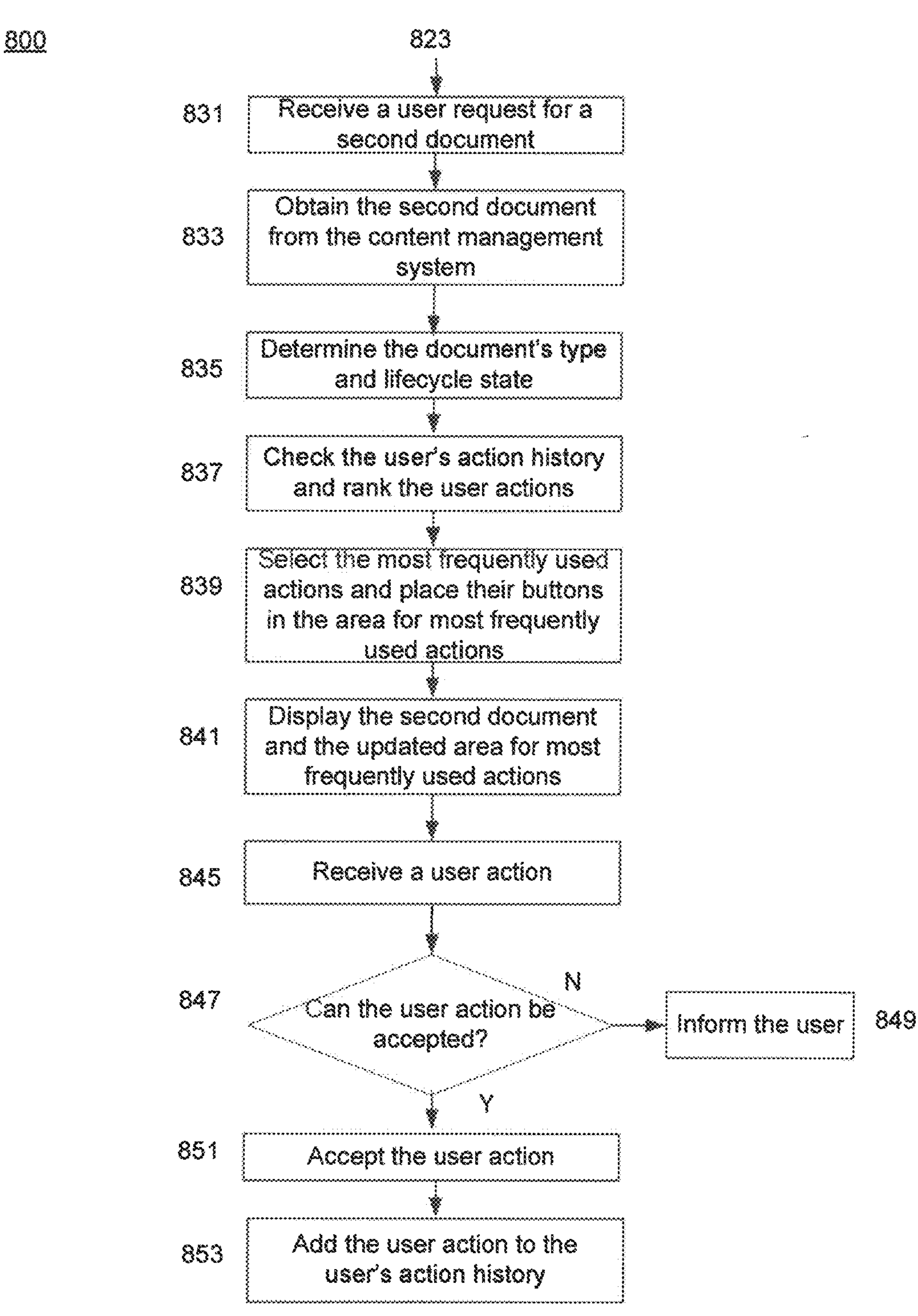

FIGS. 8A and 8B illustrate a flowchart of a method for generating a dynamic user interface according to one embodiment of the present invention. The process may start at 801.

At 803, a user may login to the content management system.

At 805, the user may select a specific application program running in the content management system.

At 807, the user may request to open a first document which is stored in the content management system and is being processed by the selected application program.

At 809, a user interface 900 may be displayed in response to the request. The user interface 900 may include the requested document and an area 910 for most frequently used actions, and the area 910 may be displayed based on previously configured default settings of the frequently used actions. In one example, the default settings may include a button for editing, a button for downloading, a button for copying, and a button for sharing.

At 811, the user's role related to the selected application program may be determined, e.g., by the content management server 112 or the dynamic user interface generator 114. In one embodiment, the user's role is a "manager", who may edit, download, copy and share the document.

At 813, the lifecycle state of the first document may be determined, e.g., by the content management server 112 or the dynamic user interface generator 114. The first document may have a number of different states, e.g., draft, review, revise, approval and publish. In one example, the document is in the Review state.

The user may edit the document. At 815, a user action for editing the document may be received.

At 817, it may be determined, by the content management server 112 or the dynamic user interface generator 114, if the user action can be accepted. The decision may be based on the process, the user's role and the state of the document.

If not, a notice may be displayed at 819.

If yes, the user action may be accepted at 821.

At 823, the user action "Edit" may be stored to the user's action history by the content management server 112 or the dynamic user interface generator 114.

The process may continue to track user actions by user, document type, and lifecycle state.

At 831, a user request for a second document, which is stored in the content management system and is being processed by the selected application program, may be received.

At 833, the second document may be obtained from a content repository, e.g., 111*a*.

At 835, the state of the second document may be determined, e.g., by the content management server 112 or the dynamic user interface generator 114. The document may have a number of different states, e.g., draft, review, revise, approval and publish. In one example, the document is in the Review state.

Then buttons to be displayed in the area 910 for most frequently used actions may be determined. At 837, the action history of the user may be checked to find out the total number of each type of user action for this type of document at this lifecycle state, and user actions may be ranked based on the frequency of use, e.g., from the most frequently used to the least frequently used.

At 839, buttons for the most frequently used N types of user actions may be selected and included in the area 910 for most frequently used actions. In one example, N is configured as 4. In one embodiment, the button for a first user action (e.g., Edit) with the largest total number may be placed at the far left side of the area 910, followed by the button for a second user action (e.g., Download) with the second largest total number. When the selected buttons for the most frequently used actions are different from the default settings, the default settings may be updated.

In one embodiment, when the total number of the second user action (e.g., Download) increase and exceeds the total number of the first user action (e.g., Edit), the area 910 for most frequently used actions may be updated by moving the button for the second user action to the far left.

In one embodiment, a predetermined separation of spread may be used to prevent frequent flip-flop. To exchange positions of the button for the second user action and the button for the first user action, M more separation of spread need to be gained. The value of m may be configured in advance. In one example, the value of Mis 3.

At 841, the second document and the updated area 910 for most frequently used actions may be displayed.

At 845, a user action for editing the second document may be received.

At 847, it may be determined, by the content management server 112 or the dynamic user interface generator 114, if the user action can be accepted. The decision may be based on the process, the user's role and the state of the document.

If not, a notice may be displayed at 849.

If yes, the user action may be accepted at 851.

At 853, the user action "Edit" may be stored to the user's action history by the content management server 112 or the dynamic user interface generator 114.

The process may continue to track user actions by user, document type, and lifecycle state.

The process may then return to 831 to continue to track user actions and update the area 910 for most frequently used actions.

Figure 10:
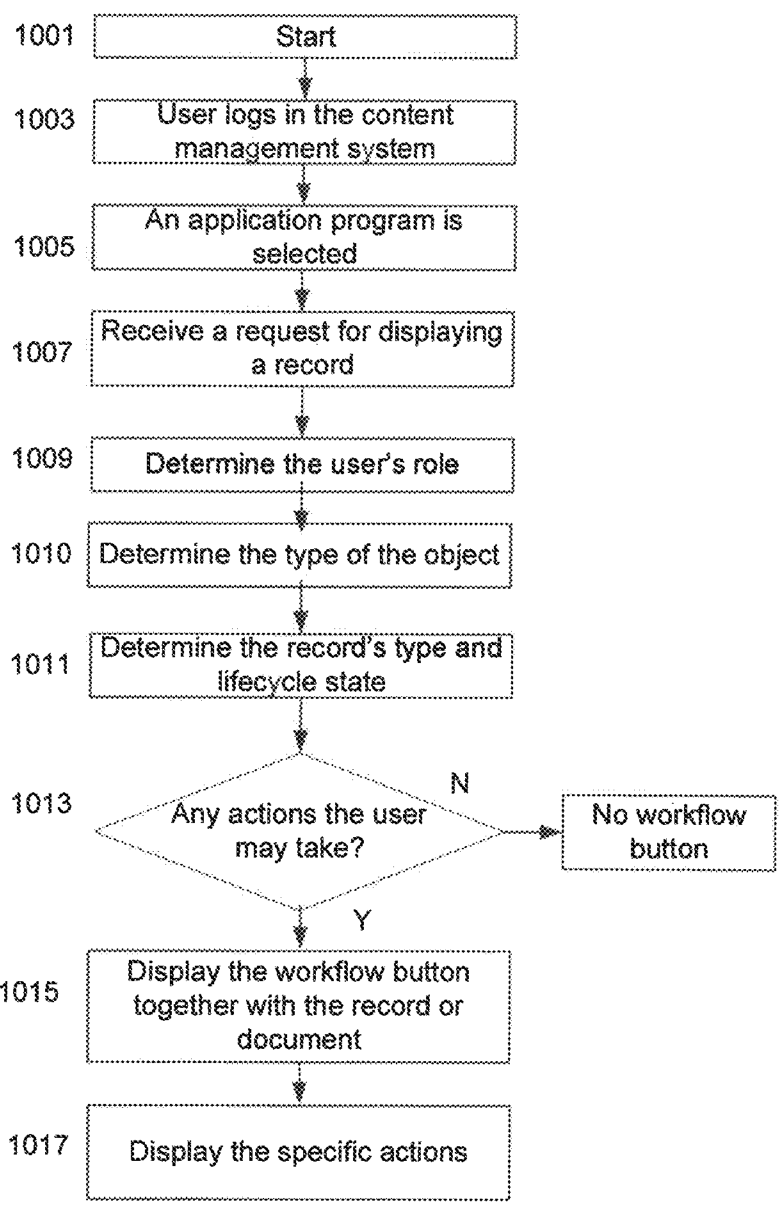
FIG. 10 illustrates a flowchart of a method for generating a dynamic user interface according to one embodiment of the present invention.

FIG. 10 illustrates a flowchart of a method for generating a dynamic user interface according to one embodiment of the present invention. The process may start at 1001.

At 1003, a user may login to the content management system.

At 1005, the user may select a specific application program running in the content management system.

At 1007, the user may request for a record or document which is stored in the content management system and is being processed by the selected application program.

At 1009, the user's role related to the selected application program may be determined, e.g., by the content management server 112 or the dynamic user interface generator 114. In one embodiment, the user's role is an assistant, and the user actions permitted for an assistant may include "Send for Review", "Send for Approval", and "Approved". However, the assistant is not allowed to "Start Workflow" or "Change State".

At 1010, the type of the object may be determined.

At 1011, the state of the record or document may be determined, e.g., by the content management server 112 or the dynamic user interface generator 114. The record or document may have a number of different states, e.g., draft, review, revise, approval and publish. In one example, the document is in the Review state.

At 1013, it may be determined if there is any action the user may take based on the process, the user's role and the lifecycle state of the record or document.

If not, no workflow button is displayed.

If yes, a workflow button may be displayed together with the record or document on the user interface 1100 at 1015. In one example, when there is only one action the user can take, the button 1111 for that action may be displayed.

At 1017, specific actions the user may take may be displayed when the user click on or mouse over the workflow button 1111, e.g., Start Workflow, Send for Review, Send for Approval, Change State, and Approved.

The present invention automatically links claims and their supporting references. The supporting references are predefined and pre-approved for the selected claim. Supporting references are added to the claim record of the selected claim. Users can see why the link is created, and analyze the claim record that is used to create this linked reference. As a result, the data are more visible and more transparent, and it is easier to run reports to understand which claim record is applied to which document.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A method for generating a dynamic user interface in a content management system, wherein the content management system comprises a first repository, a second repository, a content management server, and a dynamic user interface generator, the method comprising:

receiving at the content management controller a request from a first user for displaying a first item stored in the content management system related to a first process;

displaying a first user interface which comprises a first area for displaying the first item and a second area for displaying a first button for a first frequently used user action and a second button for a second frequently used user action, wherein the first button and the second button are displayed based on a default configuration with the first button being displayed in a place representing a most frequently used user action and the second button being displayed in a place representing a second most frequently used user action;

determining a first user's role related to the first item;

determining a lifecycle state of the first item;

receiving a first user action, wherein the first user action is an edit action to edit the first item;

determining that the first user action is acceptable based on the first process;

receiving a second user action, wherein the second user action is a download action to download the first item;

determining that the second user action is acceptable based on the first process;

updating an action history of the first user with the first user action and the second user action;

ranking the first frequently used user action and the second frequently used user action in the updated action history of the first user, wherein the first frequently used user action is an action most frequently performed by the first user on the first item, and wherein the first frequency used user action is the first user action or the second user action;

receiving at the content management controller a request from the first user for displaying a second item stored in the content management system related to the first process; and displaying a second user interface which comprises a third area for displaying the second item and a fourth area for displaying buttons for frequently used user actions, wherein the fourth area for displaying buttons for frequently used user actions is updated based on the updated action history of the first user, wherein a ranking of the first button for the first frequently used user action in the fourth area is changed from the ranking of the first button for the first frequently used user action in the second area based on the updated action history of the first user, and wherein the first frequently used user action with the changed ranking can be performed on the second item stored in the content management system.

2. The method of claim 1, further comprising: determining that the first user action is acceptable based on the first user's role.

3. The method of claim 1, further comprising: determining that the first user action is acceptable based on the lifecycle state of the first item.

4. The method of claim 1, further comprising: determining a type of the second item.

5. The method of claim 1, further comprising: determining a lifecycle state of the second item.

6. The method of claim 1, further comprising: determining that the second user action is acceptable based on the first user's role.

7. The method of claim 1, further comprising: determining that the second user action is acceptable based on a lifecycle state of the second item.

8. The method of claim 1, further comprising: receiving a selection of the first process.

9. The method of claim 1, wherein the first frequently used user action is for editing the first item.

10. The method of claim 1, wherein the second frequently used user action is for sharing the first item.

11. The method of claim 1, wherein actions in the action history of the first user is ranked by a type of the first item.

12. The method of claim 1, wherein actions in the action history of the first user is ranked by a lifecycle state of the first item.

13. The method of claim 1, wherein actions in the action history of the first user is ranked by the first user's role.

14. The method of claim 1, wherein actions in the action history of the first user is ranked based on a frequency of use from the most frequently used to the least frequently used.

15. The method of claim 1, further comprising selecting a predetermined number of actions to display in the fourth area for displaying frequently used user actions.

16. The method of claim 1, wherein the fourth area for displaying frequently used user actions displays the second button in a place representing a most frequently used user action and the first button in a place representing a second most frequently used user action when a number of the second frequently used user action exceeds a number of the first frequently used user action by a predetermined separation of spread.

17. The method of claim 1 further comprising:

determining that a third user action is acceptable based on the first process, wherein the third user action is a share action to share the first item with a second user; and updating the action history of the first user with the first user action, the second user action, and the third user action.

18. The method of claim 1, further comprising:

determining that a third user action is acceptable based on the first process, wherein the third user action is a copy action to generate a copy of the first item; and updating the action history of the first user with the first user action, the second user action, and the third user action.

* * * * *